April 2, 1929.  E. P. SLOAN  1,707,689
RETRACTOR
Filed June 22, 1928
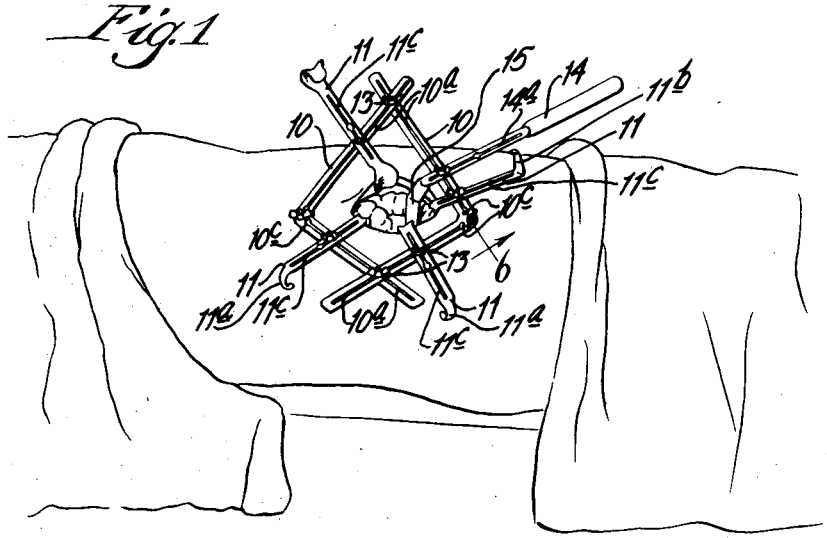
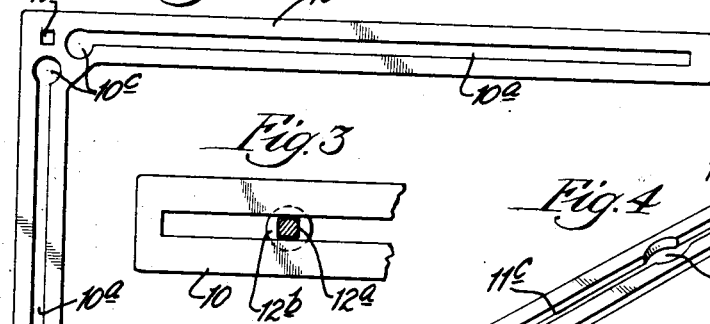
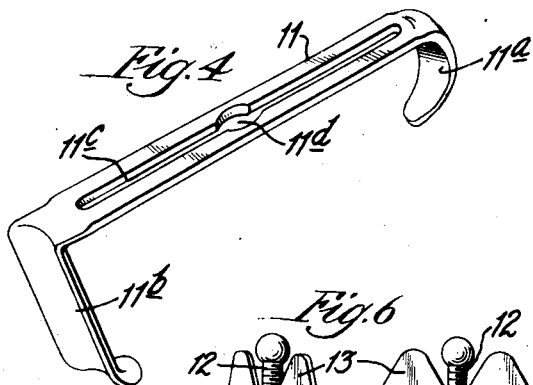
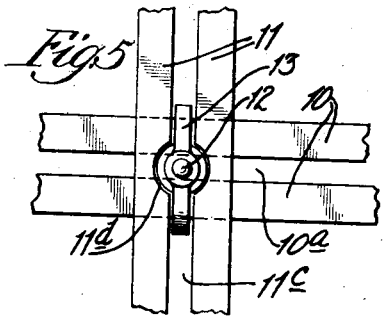
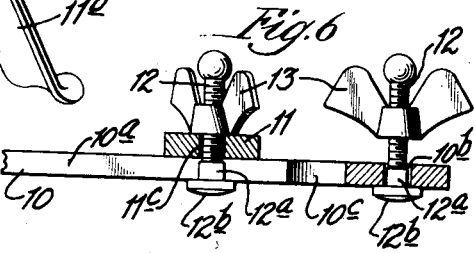
Inventor:
Edwin P. Sloan, Patented Apr. 2, 1929.

1,707,689

UNITED STATES PATENT OFFICE.

EDWIN P. SLOAN, OF CHICAGO, ILLINOIS, ASSIGNOR TO SHARP & SMITH, OF CHICAGO, ILLINOIS, A CORPORATION OF ILLINOIS.

RETRACTOR.

Application filed June 22, 1928. Serial No. 287,580.

This invention relates to improvements in retractors, and more especially a self-retaining retractor adapted for surgical use.

Among the features of my invention is the provision of a retractor that may quickly and easily be adjusted to various positions, and in which the blades are retained as adjusted. The entire structure is also rigid and self-supporting after being adjusted.

Other features and advantages of my invention will appear more fully as I proceed with my specification.

In that form of device embodying the features of my invention shown in the accompanying drawings, Fig. 1 is a view in perspective; Fig. 2 is a plan view of one of the frame members; Fig. 3 is an enlarged view of the end of one of the frame members showing one of the retaining bolts in section, Fig. 4 is a view in perspective of one of the retractor blades, Fig. 5 is a view showing how one of the retractors may be removed from the frame without taking the wing-nut off of the adjusting bolt, and Fig. 6 is a view taken as indicated by the line 6 of Fig. 1.

As shown in the drawings, the device comprises an adjustable quadrilateral frame consisting of two slotted L-shaped members. One of these members, shown in Fig. 2, is indicated by 10. Each arm of the L-shaped member is provided with a slot 10ª and there is preferably provided a square hole in the corner as indicated by 10ᵇ. The inner ends of the slots 10ª are enlarged, as indicated by 10ᶜ.

Fig. 4 shows one of the retractor blades, of which there may be any desired number with different forms of retractor hooks. The blade shown in Fig. 4 includes what may be termed a handle 11 with a hook at each end, as indicated by 11ª and 11ᵇ. The handle is provided with a slot 11ᶜ, and the center of this slot is enlarged, as indicated by 11ᵈ.

The two frame members are fastened together, as shown in Fig. 1, by means of bolts 12 with wing nuts 13. These bolts preferably have squared ends 12ª adjacent the heads 12ᵇ. The slots in the frame members permit their adjustment as desired, and such slots in co-operation with the slots in the retractor blades permit the adjustment of the blades on the frame as desired.

In Fig. 1, there is also shown a retaining implement, as indicated by 14 with a member 15 adapted to be inserted in the incision to hold the parts in position. This implement is likewise provided with a slot 14ª permitting it to be adjustably mounted on a frame member 10 by means of one of the bolts 12. Similar bolts 12 may also be placed through the holes 10ᵇ in the corners of the frame members for supporting retractor blades or other implements.

The bolts may be removed from the frame members 10 by passing the heads through the enlargements 10ᶜ at the ends of the slots, and the retractor blades may be removed from the bolts by turning the wing-nut parallel with the slot and placing the bolt opposite the opening 11ᵈ so that the wing-nut will pass through, as shown in Fig. 5. It will be seen by the provision of the slots in the frame and the handles of the retractor blades and the enlargements in such slots, that blades may be attached to the frame and removed therefrom and adjusted from time to time after the frame is in position.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A device of the character described comprising; a frame consisting of two rigid angular members adjustably secured together; and a plurality of retractor blades demountably and adjustably mounted thereon.

2. A device of the character described comprising; a quadrilateral frame consisting of two rigid angular members adjustably secured together; and a plurality of retractor blades demountably and adjustably mounted thereon.

3. A device of the character described comprising; a slotted frame; and a plurality of retractor blades demountably and adjustably mounted thereon by bolts passing through said slots.

4. A device of the character described comprising; a slotted frame; and a plurality of retractor blades with slotted handles demountably and adjustably mounted on the frame by bolts passing through the slots in the frame and the slots in the handles of the retractor blades.

5. A device of the character described comprising; a slotted quadrilateral adjustable frame; and a plurality of retractor blades with slotted handles demountably and adjustably mounted on the frame by bolts passing through the slots in the frame and the slots in the handles of the retractor blades.

6. A device of the character described comprising; a frame consisting of two slotted angular members adjustably secured together; and a plurality of retractor blades with slotted handles demountably and adjustably mounted on the frame by bolts passing through the slots in the frame and the slots in the handles of the retractor blades.

7. A device of the character described comprising; a quadrilateral frame consisting of two slotted L-shaped members adjustably secured together; and a plurality of retractor blades with slotted handles demountably and adjustably mounted on the frame by bolts passing through the slots in the frames and the slots in the handles of the retractor blades.

In witness whereof, I have hereunto set my hand this 14 day of June, 1928.

EDWIN P. SLOAN.